US005912768A

United States Patent [19]
Sissom et al.

[11] Patent Number: 5,912,768
[45] Date of Patent: *Jun. 15, 1999

[54] DEPTH-FROM-DEFOCUS OPTICAL APPARATUS WITH INVARIANCE TO SURFACE REFLECTANCE PROPERTIES

[75] Inventors: Bradley Sissom, Norwood, Mass.; Michael Sussman, Winchester, Wash.

[73] Assignee: Cognex Corporation, Natick, Mass.

[*] Notice: This patent issued on a continued prosecution application filed under 37 CFR 1.53(d), and is subject to the twenty year patent term provisions of 35 U.S.C. 154(a)(2).

[21] Appl. No.: 08/777,106

[22] Filed: Dec. 31, 1996

[51] Int. Cl.[6] .................................................. G02B 27/14
[52] U.S. Cl. .......................... 359/629; 359/625; 359/626; 359/640
[58] Field of Search ................................ 359/629, 625, 359/626, 640

[56] References Cited

U.S. PATENT DOCUMENTS

| | | | |
|---|---|---|---|
| 4,472,056 | 9/1984 | Nakagawa et al. | 356/376 |
| 4,640,620 | 2/1987 | Schmidt | 356/376 |
| 4,689,480 | 8/1987 | Stern | 250/201 |
| 4,876,455 | 10/1989 | Sanderson et al. | 250/560 |
| 4,893,183 | 1/1990 | Nayar | 358/107 |

(List continued on next page.)

FOREIGN PATENT DOCUMENTS

| | | |
|---|---|---|
| 0 183 240 A2 | 6/1986 | European Pat. Off. . |
| 0 300 164 A1 | 1/1989 | European Pat. Off. . |
| 0 563 829 A2 | 10/1993 | European Pat. Off. . |
| 0 627 610 A1 | 12/1994 | European Pat. Off. . |
| 3413605 A1 | 10/1985 | Germany . |
| 3-63507 | 8/1989 | Japan . |
| 9-26312 | 8/1989 | Japan . |
| 4-283608 | 3/1991 | Japan . |
| 4-313008 | 4/1991 | Japan . |
| 6-249632 | 2/1993 | Japan . |
| 7-311025 | 5/1994 | Japan . |
| 8-233544 | 2/1995 | Japan . |
| 9-5046 | 6/1995 | Japan . |
| 8-152308 | 9/1995 | Japan . |
| 8-304043 | 9/1995 | Japan . |
| 9-96512 | 9/1995 | Japan . |
| 9-127420 | 11/1995 | Japan . |
| WO 96/41304 | 12/1996 | WIPO . |

OTHER PUBLICATIONS

A. Pentland, S. Scherock, T. Darrell, and B. Girod. "Simple range cameras based on focal error," J. Opt. Soc. Am. A., vol. 11, No. 11, Nov. 1994, pp. 2925–2934.

B. Girod, and S. Scherock "Depth from Defocus of Structured Light," SPIE vol. 1194 Optics, Illumination, and Image Sensing for Machine Vision IV (1989), pp. 209–215.

(List continued on next page.)

*Primary Examiner*—Hoa Q. Pham
*Assistant Examiner*—Reginald A. Ratliff
*Attorney, Agent, or Firm*—Russ Weinzimmer

[57] ABSTRACT

A depth-from-defocus optical apparatus is provided for use with a depth-from-defocus three-dimensional imaging system for obtaining a depth image of an object. The invention facilitates the formation of depth images of objects exhibiting specular reflection, either alone or in combination with diffuse reflection, thereby allowing the application of depth-from-defocus three-dimensional imaging to objects such as microelectronic packages. The optical apparatus of the invention generally includes an illumination source, a projection lens assembly for converging rays of incident light towards an object, and a viewing lens assembly for converging rays of reflected light towards an image plane. Importantly, the viewing lens assembly is of the same working f-number as the projection lens assembly. In preferred embodiments, both the projection lens assembly and the viewing lens assembly exhibit object-side telecentricity so as to substantially eliminate vignetting of off-axis specular object features, and consequently, substantially eliminate specular false depth. The invention can also include an uncrossed polarizer/analyzer pair to balance the dynamic range of specular reflections with the dynamic range of diffuse reflections so as to effectively utilize the limited dynamic range of a single image detector.

50 Claims, 8 Drawing Sheets

U.S. PATENT DOCUMENTS

| | | | |
|---|---|---|---|
| 4,912,336 | 3/1990 | Nayar et al. | 250/560 |
| 4,984,893 | 1/1991 | Lange | 356/376 |
| 4,988,202 | 1/1991 | Nayar et al. | 356/394 |
| 5,151,609 | 9/1992 | Nakagawa et al. | 250/561 |
| 5,239,178 | 8/1993 | Derndinger et al. | 250/234 |
| 5,248,876 | 9/1993 | Kerstens et al. | 250/561 |
| 5,424,835 | 6/1995 | Cosnard et al. | 356/376 |
| 5,475,415 | 12/1995 | Noethen | 359/629 |
| 5,546,189 | 8/1996 | Svetkoff et al. | 356/376 |
| 5,589,942 | 12/1996 | Gordon | 356/376 |
| 5,617,209 | 4/1997 | Svetkoff et al. | 356/376 |
| 5,636,066 | 6/1997 | Takahashi | 359/629 |
| 5,659,420 | 8/1997 | Wakai et al. | 359/368 |

OTHER PUBLICATIONS

P. Caber, "Interferometric profiler for rough surfaces," Applied Optics, vol. 32, No. 19, Jul. 1, 1993, pp. 3438–3441.

S. Nayar and Y. Nakagawa, "Shape from Focus," IEEE Transactions on Pattern Analysis and Machine Intelligence, vol. 16, No. 8, Aug. 1994, pp. 824–830.

Y. Xiong and S. Shafer, "Depth from Focusing and Defocusing," Proc. IEEE Conference on Computer Vision and Pattern Recognition 1993, pp. 68–73.

J. Wyant, "How to extend interferometry for rough surface tests," Laser Focus World, Sep. 1993, pp. 131–133.

J.-A. Beraldin, M. Rioux, F. Blais, and R. A. Couvillon, "Digital Three–dimensional Imaging in the Infrared at the National Research Council of Canada," SPIE vol. 2269 Infrared Technology XX (1994), pp. 208–225.

Z.J. Geng, "Rainbow three–dimensional camera: new concept of high–speed three–dimensional vision systems," Optical Engineering, vol. 35 No. 2, Feb. 1996, pp. 376–383.

M. Watanabe and S. Nayar, "Telecentric Optics for Constant–Magnification Imaging," Technical Report CUCS–026–95, Dept. of Computer Science, Columbia University, New York, NY, USA, Sep. 1995.

M. Watanabe, S. Nayar, and M. Noguchi, "Active Focus Range Sensor," Implementation Technical Note, Dept. of Computer Science, Columbia University, New York, NY, USA, Jun. 1995.

M. Watanabe, S. Nayar, and M. Noguchi, "Real–time computation of depth from defocus," Proc. of SPIE v 2599, 1996, pp. 14–25.

S. Nayar, M. Watanabe, and M. Noguchi, "Real–Time Focus Range Sensor," IEEE Transactions on Pattern Analysis and Machine Intelligence, vol. 18, No. 12, Dec. 1996, pp. 1186–1198.

M. Noguchi and S. Nayar, Microscopic Shape from Focusing Using Active Illumination, Proc. IEEE Conference on Computer Vision and Image Processing 1994, pp. 147–152.

M. Subbarao and G. Surya, "Depth from Defocus: A Spatial Domain Approach," International Journal of Computer Vision, 13, 3, 1994, pp. 271–294.

R. Stone and S. Shafer, "Surface Roughness Estimation," The Robotics Institute, Carnegie Mellon University, Pittsburgh, PA, USA.

A. Pentland, "A New Sense for Depth of Field," IEEE Transactions on Pattern Analysis and Machine Intelligence, vol. PAMI–9, No. 4, Jul. 1987, pp. 523–531.

M. Ishihara and H. Sasaki, "High Speed 3–D Shape Measuring Apparatus using Shape from Focus Method," Seimitsu Kogaku Kaishi (Precision Engineering Journal), vol. 63, No. 1, 1997, pp. 124–128.

"Confocal Microscopy," Optical Instruments, pp. 17.40–17.43.

R. Webb, "Confocal Microscopes," Optics & Photonics News, Jul. 1991, pp. 8–13.

R. Schneider, A. Schick, P. Kollensperger, and T. Ninomiya, "High–speed optical three–dimensional scanner for automatic solder joint inspection," Optical Engineering, vol. 36, No. 10, Oct. 1997, pp. 2878–2885.

M. Ishihara, "High Speed 3–D Shape Measurement for a Small Object," Dai Ni–kai Gazou Senshing Shinpojiumu Kouen Ronbunshuu (Collection of the Lectures at the 2nd Image Sensing Symposium), Jun. 1996, pp. 155–158.

M. Ishihara and H. Sasaki, "High Speed 3–D Shape Measurement Using Non–Scanning Multibeam Confocal Lens System," Dai San–kai Gazou Senshing Shinpojiumu Kouen Ronbunshuu (Collection of the Lectures at the 3rd Image Sensing Symposium).

T. Yamashita and H. Nakashima; M. Nagashima and K. Nishiuchi, "Measuring longitudinal displacements using laser beam diffraction changes near the focal point," Rev. Sci. Instrum., vol. 64, No. 8, Aug. 1993, pp. 2245–2249.

Patent Abstracts of Japan, vol. 8, No. 6 (P–247) '1443!, Jan. 12, 1984 & JP 58 169008 A (Nippon Denki K.K.), Oct. 5, 1983.

DEPTH-FROM-DEFOCUS OPTICAL APPARATUS WITH INVARIANCE TO SURFACE REFLECTANCE PROPERTIES

FIELD OF THE INVENTION

This invention relates to three-dimensional imaging systems, and particularly to depth-from-defocus optical apparatus.

BACKGROUND OF THE INVENTION

Referring to FIG. 1, the behavior of light at a reflecting surface of a substrate 10 can be described as either specular reflection 12 or diffuse (also called Lambertian) reflection 14. In specular reflection, the rays of an incident bundle of light rays 16 all reflect from a smooth surface of the substrate 10 at an angle β equal to their respective angles of incidence α (Snell's Law). For example, a mirror is a reflecting surface that exhibits substantially specular reflection. By contrast, in diffuse reflection 14, the majority of the rays of an incident bundle of light rays 18 reflect from the surface of the substrate 10 at respective angles not equal to their respective original angles of incidence α.

Traditional "depth-from-defocus" apparatus includes the apparatus described in a paper entitled "Real-Time Focus Range Sensor", presented and distributed by Nayar, Watanabe, and Noguchi at the International Conference on Computer Vision (ICCV95), Nov. 30, 1994, and in M. Watanabe, S. K. Nayar, and M. Noguchi, "Real-time Computation of depth from defocus". Proc. of the SPIE, vol 2599:A-03, p.14–25, November 1995. This apparatus is part of a system that uses light reflected from an illuminated surface to determine the depth of the features of an object. However, such "depth-from-defocus" systems do not always correctly determine the depth of the specular features of an object. This is due in part because depth-from-defocus apparatus typically include crossed polarizers to "cut out" or substantially attenuate specular reflections.

Typically, crossed polarizers, i.e., polarizers rotated 90 degrees with respect to each other, attenuate specular reflections by more than 90%. This degree of attenuation effectively prevents light reflected from specular object features from reaching the image sensor, and consequently, results in the loss of depth information conveyed by light reflected from the specular object features. For this reason, traditional depth-from-defocus apparatus is restricted to imaging objects having surfaces that exhibit entirely diffuse reflection, such as clay pots, cardboard models, and styrofoam cups, as presented in Watanabe, Nayar, and Noguchi; "Real-time computation of depth from defocus" Proc. of the SPIE, vol 2599:A-03, p.14–25, November 1995.

Thus, to obtain three-dimensional images of entirely specular objects, such as a mirror-like structure on a silicon wafer, or objects exhibiting both specular and diffuse reflection such as a solder joint on a circuit board, another approach to obtaining depth information from defocus effects must be used.

SUMMARY OF THE INVENTION

A depth-from-defocus optical apparatus is provided for use with a depth-from-defocus three-dimensional imaging system for obtaining a depth image of an object. The optical apparatus of the invention generally includes an illumination source, a projection lens assembly for converging rays of incident light towards an object located at an object plane, a viewing lens assembly for converging rays of reflected light originating from the surface of the object towards an image plane, and a beam splitting device located so as to permit a portion of the rays of incident light to reach the object, and so as to permit a portion of the rays of reflected light to enter the viewing lens assembly. In a preferred embodiment, the viewing lens assembly is cooperative with a single image sensor. Importantly, the viewing lens assembly is of the same working f-number as the projection lens assembly. In various preferred embodiments, the projection lens assembly includes an adjustable aperture stop, and/or the viewing lens assembly includes an adjustable aperture stop. In other alternate embodiments, the viewing lens assembly and the projection lens assembly share at least one common optical element, such as one or more common lens elements.

In some preferred embodiments, the illumination source includes a light source, a condenser lens, and a periodic illumination mask. In other preferred embodiments, the illumination source includes a light source and a condenser lens, but no structured illumination mask.

In other preferred embodiments, the projection lens assembly includes a first polarizer in a first angular orientation, and the viewing lens assembly includes a second polarizer in a second angular orientation. Further, the first angular orientation preferably differs from the second angular orientation by a difference angle magnitude substantially different from both 90 degrees and 270 degrees. In other embodiments, the relative orientation of the pair of polarizers is adjustable. In further preferred embodiments, the first polarizer and the second polarizer are angularly oriented relative to each other such that a range of intensities of specular object feature reflections is substantially close to a range of intensities of diffuse object feature reflections.

In other preferred embodiments, the projection lens assembly exhibits object-side telecentricity, and/or the viewing lens assembly exhibits object-side telecentricity, the best performance being attained when both the projection lens assembly and the viewing lens assembly exhibit object-side telecentricity.

In other preferred embodiments, the beam splitting device is located so as to make a focal plane of the viewing lens assembly coincident with a focal plane of the projection lens assembly. Further, the beam splitting device is located so as to fold a portion of a central axis of the viewing lens assembly into coaxial relationship with a portion of a central axis of the projection lens assembly.

The invention makes use of a polarizer/analyzer pair in an uncrossed configuration to balance the dynamic range of specular reflections with the dynamic range of diffuse reflections. The invention recognizes and exploits an "optical coupling" effect that dictates how the working f-number of the projection system and the viewing system are preferably matched when objects with specular features are to be studied. As recognized by the invention, equating working f-numbers of the projection system and viewing system eliminates paraxial specular false depth. As further recognized by the invention, object-side telecentricity of the projection system and the viewing system substantially eliminates off-axis specular false depth. Although a single-lens embodiment provides good performance in some applications, a two-lens embodiment can minimize backscatter and veiling glare problems.

The invention solves some of the problems of the prior art. In particular, the invention facilitates the formation of three-dimensional images of objects exhibiting specular reflection, either alone or in combination with diffuse reflection. Further, the invention allows the application of depth-from-defocus three-dimensional imaging to objects such as microelectronic packages, e.g., ball grid arrays, flip chips, and other surface mount devices. Commonly, such devices exhibit both specular and diffuse reflective behavior, and consequently have confounded known depth-from-defocus techniques. Moreover, the invention maximizes use of limited image detector dynamic range, and maximizes useful field of view, especially as applied to off-axis specular object features. By incorporating coaxial projection and viewing systems, the invention also eliminates the shadowing and correspondence problems inherent to triangulation-based three-dimensional imaging techniques.

BRIEF DESCRIPTION OF THE DRAWINGS

The invention will be more fully understood from the following detailed description, in conjunction with the accompanying Figures, wherein.

DETAILED DESCRIPTION OF THE FIGURES

Figure 2:
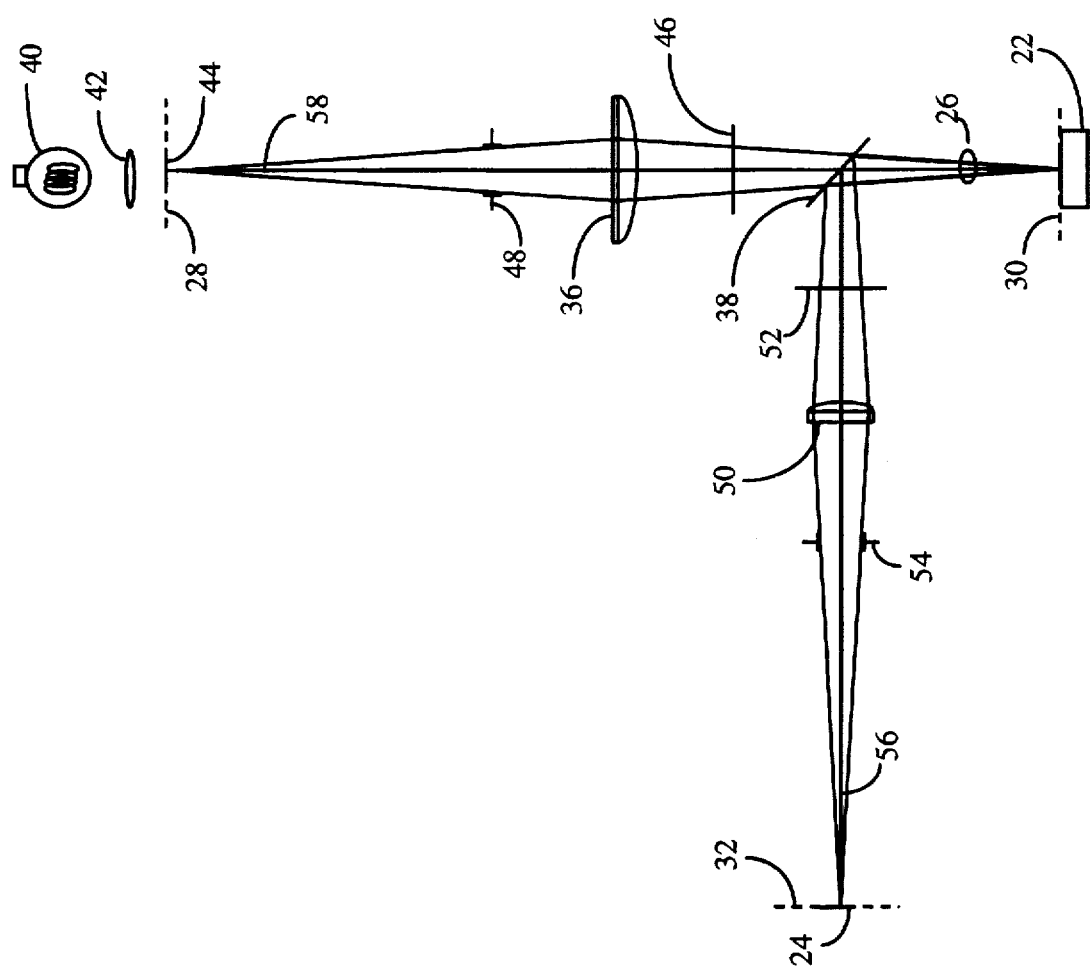
FIG. 2 is a schematic diagram of a non-telecentric embodiment of the depth-from-defocus optical apparatus of the invention, including a paraxial ray diagram.

FIG. 2 schematically represents an embodiment of the depth-from-defocus optical apparatus of the invention. The primary purpose of the optical apparatus shown in FIG. 2 is to project a periodic illumination pattern, such as a checkered illumination pattern, onto an object 22, and form an image of the illuminated object on an imaging device, such as a charged coupled device (CCD) 24. Other periodic illumination patterns include a striped pattern, wherein stripes of light alternate with stripes of relative darkness, and sinusoidal illumination patterns, in both one- and two-dimensions, where light/darkness is a sinusoidal function of distance along one or two dimensions. Principal and marginal rays 26 are shown to indicate planes of focus 28, 30, and 32, and the action of a projection lens 36, an imaging lens 50, and a beam splitting device 38, such as a plate beam splitter, a cube beam splitter, or a pellicle, for example.

Checkered illumination is accomplished by using a projection system to project the image of a checkered mask onto the object. The projection system consists of a light source 40, a condenser lens 42, a checkered mask 44, a projection lens 36, and a polarizer 46. The aperture stop 48 of the projection lens 36 is also shown. The focal plane 30 of the projection system is made to coincide with a primary plane surface of the object 22. The checkered mask 44 can include a glass substrate that has an array of opaque regions, each opaque region being coated by a layer of chrome or carbon black, deposited using a photolithographic technique or an electron beam sputtering technique, for example. The array of opaque regions alternate with an array of transparent regions, each transparent region being uncoated. Rays of light passing through the opaque regions are focused at the object focal plane 30 by the lens 36 to create square regions or "checks" of incident light upon the object 22.

Imaging of the object 22 is accomplished using an imaging lens 50 that can be structurally identical to the lens 36 of the projection system. The viewing system consists of an image sensor 24, such as a charge coupled device CCD, the imaging lens 50, and a polarizer 52 in un-crossed relationship (not equal to 90 degrees or 270 degrees) with the orientation of the projection system polarizer 46. The aperture stop 54 of the imaging lens 50 is also shown.

It is important to note that although it is known to include a projection lens 36 that is identical to a viewing lens 50 in a depth-from-defocus optical apparatus, such as disclosed in M. Watanabe, S. K. Nayar, and M. Noguchi, "Real-time Computation of depth from defocus". Proc. of the SPIE, vol 2599:A-03, p.14–25, November 1995, the present invention recognizes that the projection lens and the viewing lens need not be identical, and the prior art is apparently silent regarding any advantage of using identical lens assemblies in a depth-from-defocus optical apparatus. Further, the prior art is apparently silent on determining the relative settings or sizes of the projection lens aperture stop 48 and the viewing lens aperture stop 54 in such an optical apparatus.

Known depth-from-defocus optical apparatus include a pair of "crossed" polarizers. Optical apparatus with "crossed" polarizers in the projection and viewing systems respectively are known as "polariscopes". The term "analyzer" is used here for consistency with the technical literature on polariscopes. Taken together, the two polarizers 46 and 52 in this apparatus are known as a polarizer/analyzer pair. An explanation of crossed polarizers can be found in Hecht and Zajac, Optics, Third Printing, December 1976, ISBN 0-201-02835-2, page 226, herein incorporated by reference.

The axis 56 of the viewing system is made to coincide with the axis 58 of the projection system near the object focal plane 30 by including a beam splitting device 38.

Further, the beam splitting device 38 ensures that a focal plane 30 of the projection system coincides with a focal plane of the viewing system.

Figure 3:
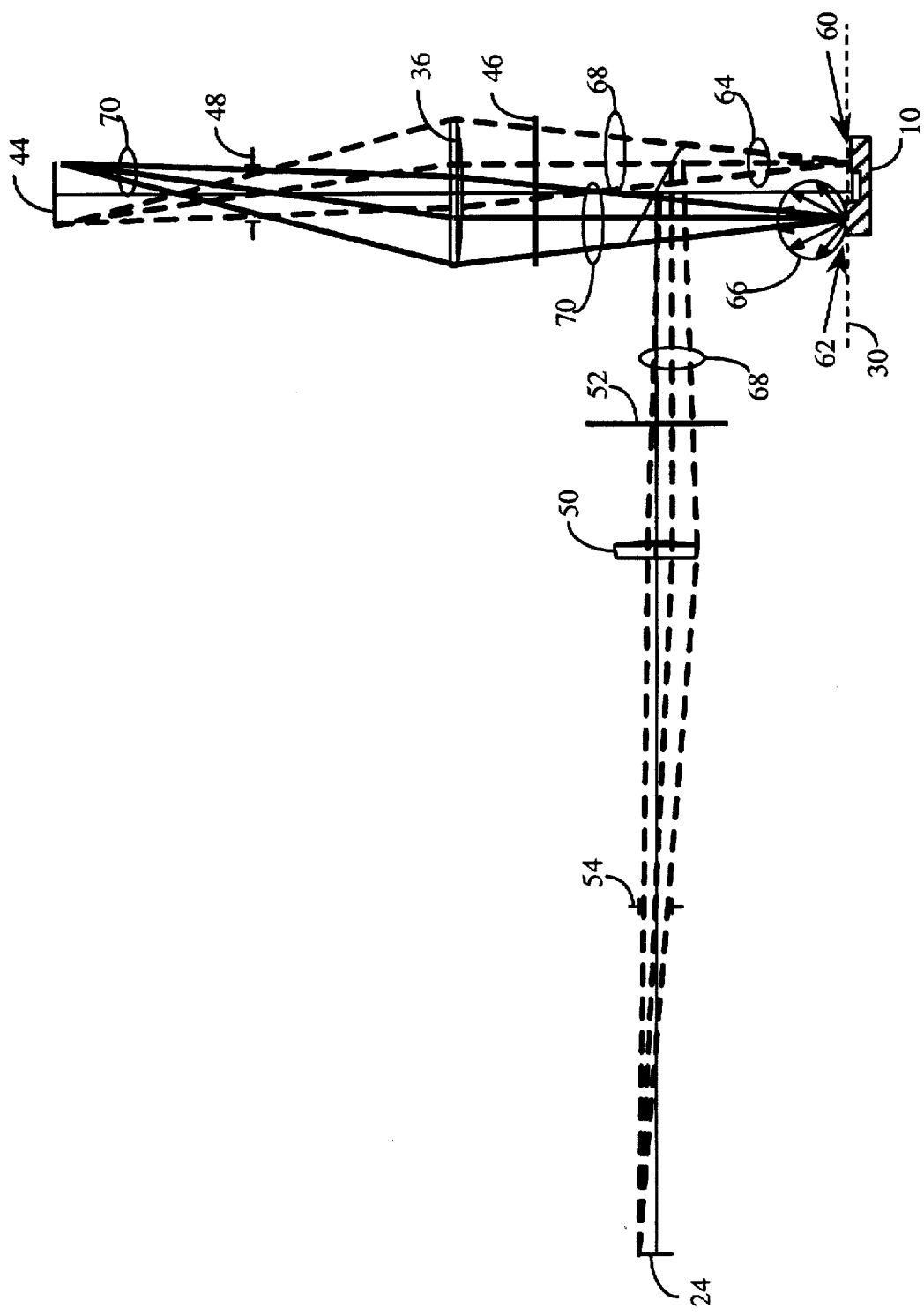
FIG. 3 is a schematic diagram of a depth-from-defocus optical apparatus of the invention having a projection system and a viewing system, each with the same working f-number. The embodiment shown includes optional uncrossed polarizers. The schematic diagram also includes ray diagrams of specular and diffuse reflections.

Referring to FIG. 3, according to the invention, "optical coupling" due to transmitting specular reflections through an uncrossed polarizer/analyzer pair of a viewing system can be utilized advantageously when evaluating the depth of specular object features, as will be explained further below. In contrast to traditional depth-from-defocus optical apparatus, the depth from defocus optical apparatus of the invention shown in FIG. 3, for example, does not include a crossed (90 degree relative angular displacement) polarizer/analyzer pair so as to allow specular reflections 60 at an illuminated and viewed object 10 to be sensed at an image detector 24. Specular regions of the object 10 enable "optical coupling" in the sense that portions of an image projected onto specular regions of the object by the projection system are then further projected onto the detector 24 of the viewing system. In a preferred embodiment of the invention, a polarizer/analyzer pair 46, 52 is included that is always at a relative angular displacement that is not equal to 90 and not equal to 270 degrees, so as to permit at least some of the light entering the viewing system from specular reflection 60 at the object 10 to reach the detector 24. The particular angular displacement that is optimal depends on the material of the object under study, and is easily found by manual adjustment of the polarizer/analyzer pair 46, 52. Thus, the invention allows specular reflections at the object to be used in a depth-from-defocus analysis, along with diffuse reflections at the object. As further recognized by the invention, it is sometimes useful when evaluating the depth of object features exhibiting specular reflection to exploit the specular reflections, rather than absorb such specular reflections using a crossed polarizer/analyzer pair, as in the prior art.

As further recognized by the invention, it is advantageous to choose a relative angle between the polarizer and analyzer that attenuates specular reflections such that the range of intensities of the specular reflection is approximately equal to the range of intensities of diffuse reflections. This choice of appropriate relative polarizer/analyzer angle most effectively utilizes the dynamic range of the image detector, thereby significantly reducing the likelihood of detector saturation.

Figure 1:
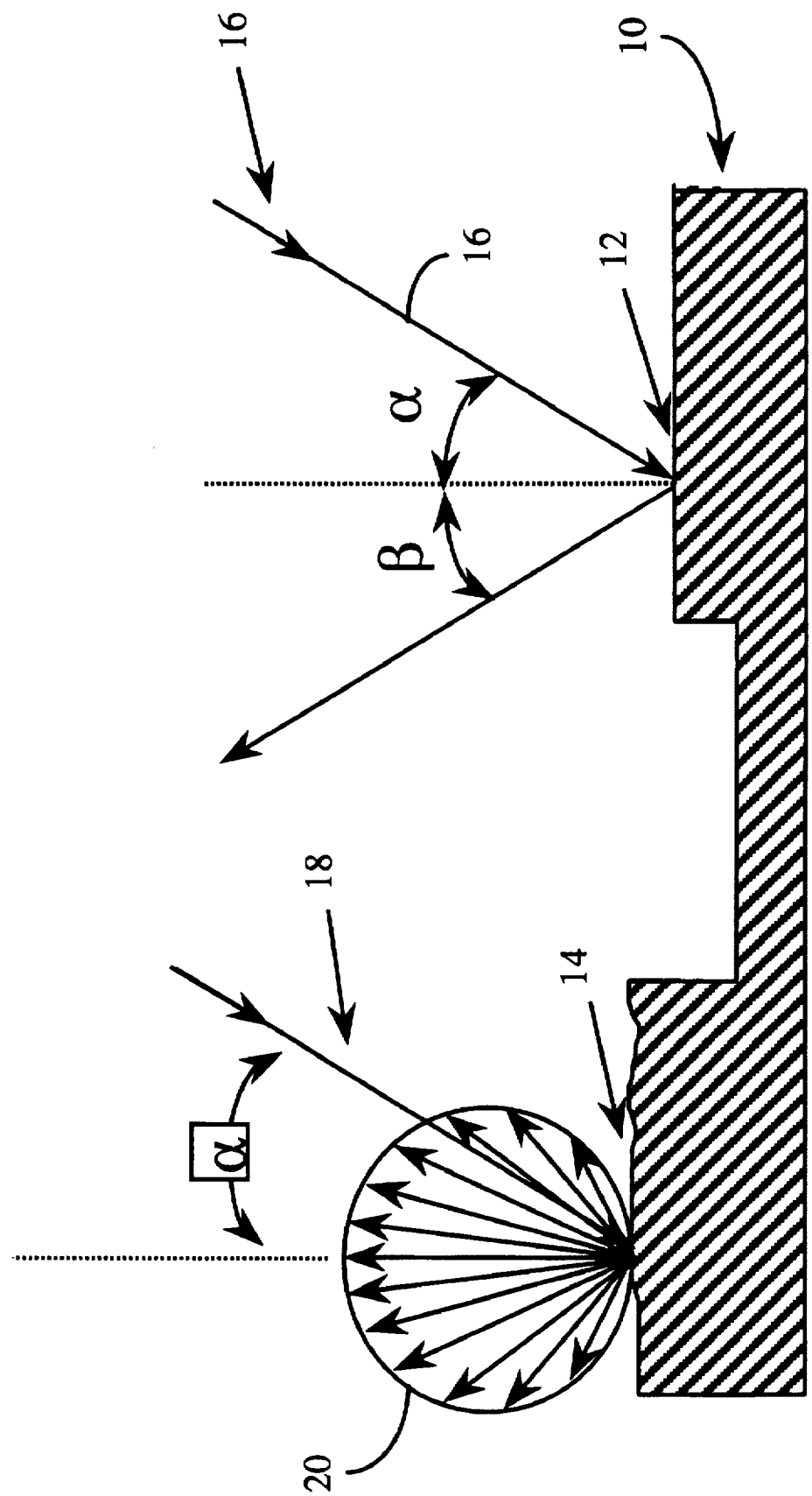
FIG. 1 is a ray diagram of the behavior of incident light rays and reflected light rays on specularly reflecting and diffusely reflecting surfaces.

Referring again to FIG. 3, to determine a three-dimensional image of an object using depth-from-defocus image analysis and the optical apparatus of the invention, a surface of the object is placed at the object plane 30. FIGS. 1 and 3 each show an object 10 that has both specular surface features 60 and diffuse surface features 62. Rays incident upon the object 10 that are specularly reflected 64 and diffusely reflected 66 are also shown. The checkered pattern that is projected by the projection system creates square patches of incident light that fall on both the specular and diffuse features of the object 10. Square patches of incident light that fall on specular features are herein termed "specular checks", and square patches of incident light that fall on diffuse features are herein termed "diffuse checks".

Specular object features corresponding to specular checks act as mirrors, thereby redirecting incident light rays from the projection system according to Snell's Law of Reflection, wherein the angle of incidence α equals the angle of reflection β, as shown in FIG. 1. Mirror reflection redirects an intact projected image of the checkered mask towards the viewing system, where it is re-imaged onto the CCD 24. Because the image of the checkered mask focused at the CCD 24 is identical to the image of the checkered mask projected onto the object focal plane 30, the projection and viewing systems are said to be "optically coupled" at each specular check. Note that the redirected intact image of the checkered mask would be effectively absorbed by the crossed analyzer of a traditional depth from defocus apparatus. Thus, since a polarizer/analyzer pair crossed at ninety degrees effectively does not transmit light from specular reflections, optical coupling effectively cannot occur in known depth-from-defocus apparatus.

Object features corresponding to diffuse checks 62 scatter incident light rays from the projection system randomly, as shown in FIGS. 1 and 3. Only a small percentage of these randomly reflected light rays obey Snell's Law for Reflection. For this reason, an intact image of the checkered mask is not redirected toward the viewing system, and consequently the projection and viewing systems are said to be "optically decoupled" at each diffuse check.

FIG. 3 shows the test object 10 in a depth-from-defocus optical apparatus. The dotted rays 68 illustrate how the checkered mask image propagates through an optically coupled projection/viewing system. The dotted rays 68 clearly show that a specular check (an illuminated portion of a specular object feature) 60 acts as a mirror to relay the mask image. By contrast, solid rays 70 illustrate how a diffuse check (an illuminated portion of a diffuse object feature) 62 "decouples" the projection system from the viewing system and does not reflect an intact image of the checkered mask.

Known depth-from-defocus systems, such as M. Watanabe, S. K. Nayar, and M. Noguchi, "Real-time Computation of depth from defocus". Proc. of the SPIE, vol 2599:A-03, p.14–25, November 1995, infer depth from changes in check contrast (or defocus). Depth estimates are made using a defocus function[4,8] that is proportional to the f-number of the optics. As recognized by the invention, a depth-from-defocus optical system with an uncrossed (<90 degree) polarizer/analyzer pair has two working f-numbers: a viewing system working f-number; this is the f-number that applies to diffuse check imaging, and an optically coupled viewing/projection system working f-number; this is the f-number that applies to specular check imaging. Consequently, when viewing a surface with both specular and diffusely reflecting regions, i.e., a "mixed-reflectance" surface, a depth-from-defocus system with uncrossed polarizers exhibits two defocus functions. As recognized by the invention, false depth will occur if the two defocus functions are not identical, because presently only one defocus function can be modeled in processing software. Modeling two defocus functions in the software is impractical because there is no reliable way to distinguish a specular feature from a diffuse feature in a single image.

Figure 4:
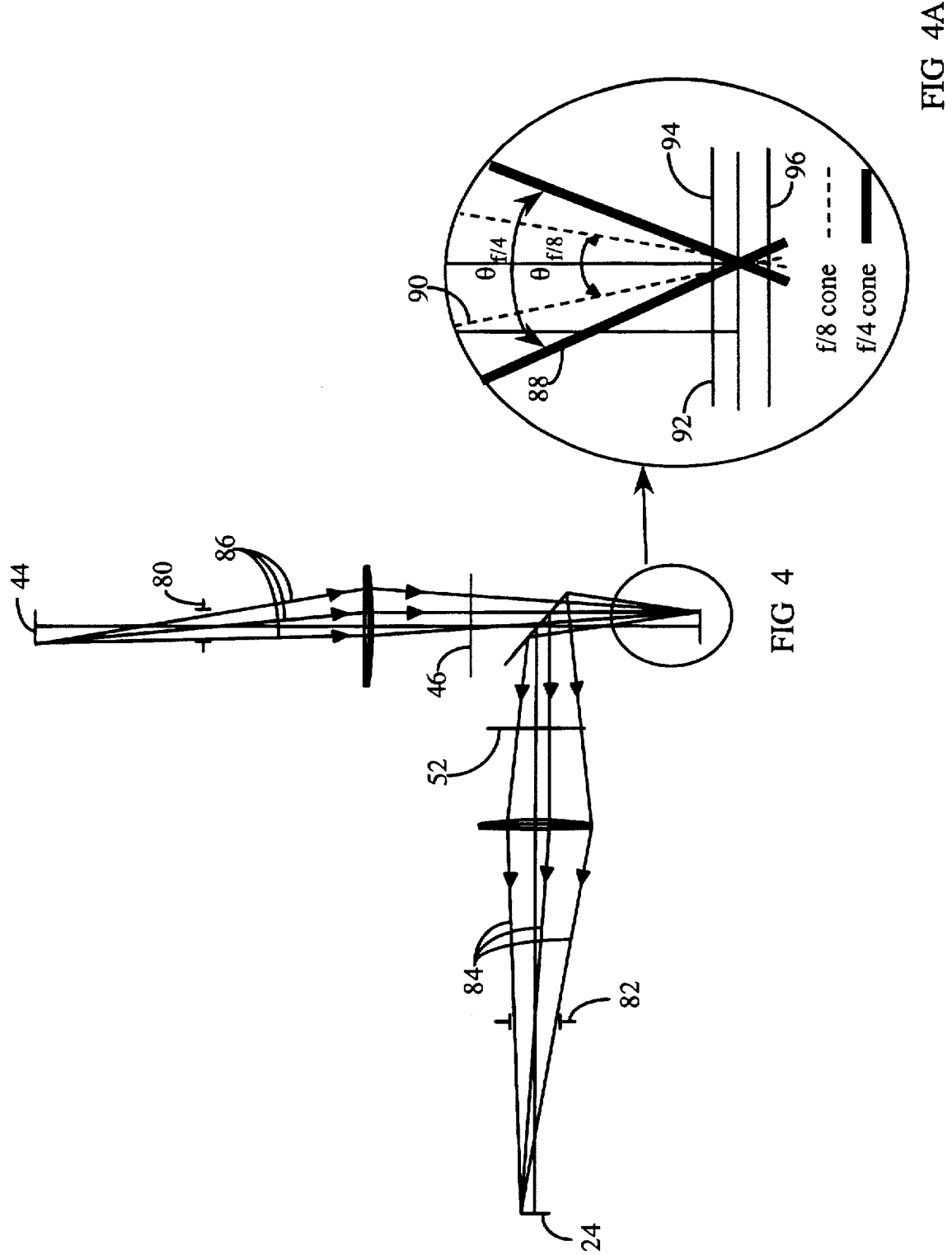
FIG. 4 is a schematic diagram of a depth-from-defocus optical apparatus of the invention having a projection system and a viewing system, each with a different working f-number, again including optional uncrossed polarizers. The schematic diagram also includes ray diagrams of two cones of light at an off-axis point, wherein the two cones of light correspond to the two different working f-numbers.

FIG. 4 depicts a depth-from-defocus optical system of the invention with an uncrossed (not equal to 90 degrees and not equal to 270 degrees) polarizer/analyzer pair 46, 52 that exhibits two f-numbers when viewing a mixed reflectance surface. In this example, an adjustable projection lens aperture stop 80 is set so that the working f-number is f/8, and an adjustable viewing system aperture stop 82 is set so that the working f-number is f/4. The ray diagram of FIG. 4 shows the chief and marginal rays 84 of the viewing system, and the chief and marginal rays 86 of the projection system. The angles $\theta_{f/4}$ and $\theta_{f/8}$ subtended by the marginal rays of the respective adjustable aperture stops 82 and 80 are the respective angles of the respective cones of light 88 and 90 corresponding to a single image point in a plane of focus 92. Each of the angles $\theta_{f/4}$ and $\theta_{f/8}$ is related to the working f-number by the equation:

Working f/#=1/θ        Equation 1 where θ is the cone angle in radians. The minimum working f/# of a lens (i.e., without the effect of an adjustable stop or fixed stop) can also be defined as the focal length of the lens divided by the diameter of the entrance pupil of the lens.

Referring to FIG. 4A, the area near the object is shown in magnified detail so as to make the difference in the f/4 cone of light 88 and the f/8 cone of light 90 is more evident. When the object is displaced from a focal plane 92 of the viewing system to either a raised object plane 94 or to a lowered object plane 96, an in-focus point will blur. As the point becomes defocused, the amount of defocus increases at a rate proportional to the cone angle θ (See, for example, Smith, Warren J; *Modern Optical Engineering 2nd Edition*; McGraw Hill 1990, herein incorporated by reference in its entirety, at page 358).

In FIG. 4, as specular checks defocus, the amount of defocus (also called the "defocus function") changes at a rate proportional to $\theta_{f/8}$ because the smallest aperture stop, e.g., the adjustable aperture stop 80, in the coupled projection/viewing system determines the specular working f-number, as explained on page 134 of Smith, Warren J; *Modern Optical Engineering 2nd Edition*; McGraw Hill 1990. As diffuse checks defocus, the amount of defocus changes at a rate proportional to $\theta_{f/4}$ because the smallest stop in the decoupled viewing system, e.g., the adjustable stop 82, gives a diffuse working f-number of f/4. As recognized by the invention, since, in this case, the amount of defocus of the diffuse checks changes at twice the rate of the amount of defocus of the specular checks, and since a depth from defocus system infers depth from changes in amount of defocus, object features corresponding to specular checks will be evaluated as one half of their actual depth. This effect is called herein "specular false depth".

Figure 5:
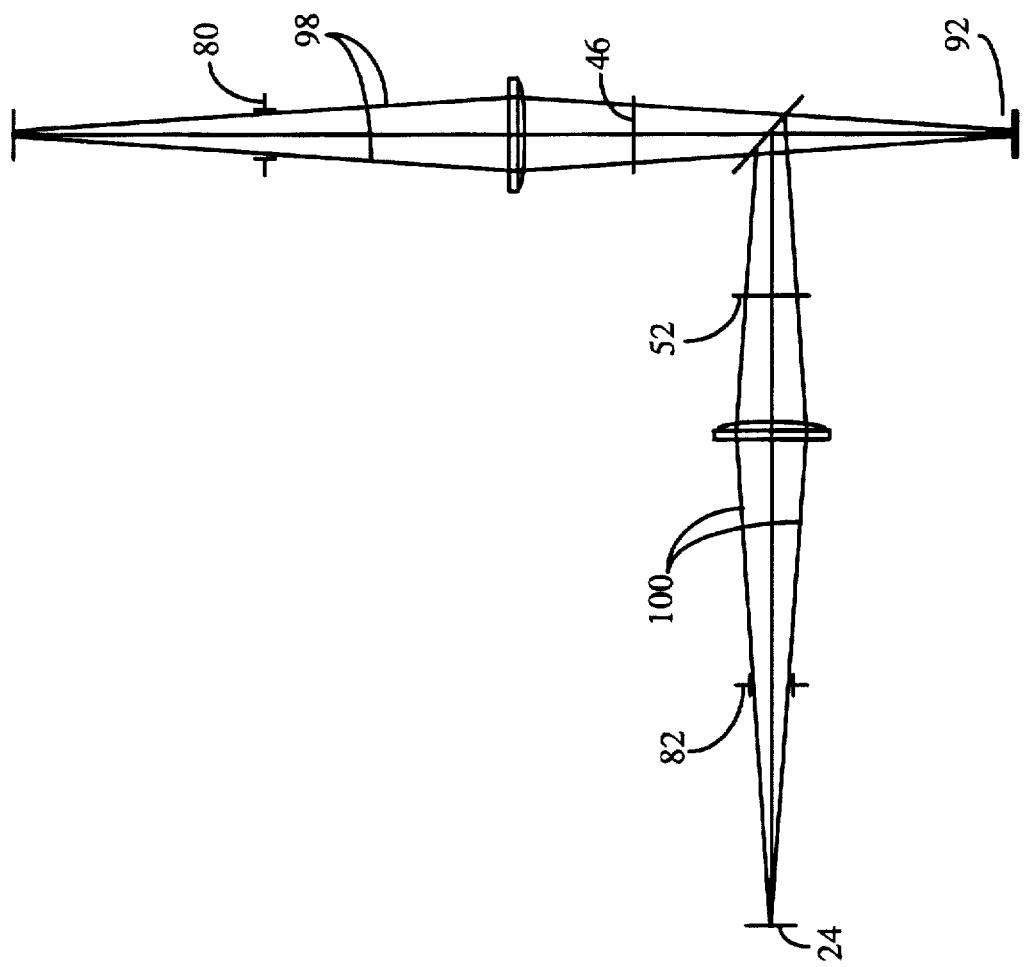
FIG. 5 is a schematic diagram of a depth-from-defocus optical apparatus of the invention having a projection system and a viewing system, each with the same working f-number, again including optional uncrossed polarizers. The schematic diagram also includes a paraxial ray diagram.

According to the invention, specular false depth within a viewing region near the central axis of the optical system, i.e., "paraxial specular false depth", can be avoided in depth-from-defocus optical systems that can be coupled by specular object features by equating the working f-numbers of the projection system and the viewing system. In practice, when the projection lens and the imaging lens are identical, this condition reduces to equating the diameter of the projection lens aperture stop 80 to the diameter of the imaging lens aperture stop 82. This equal aperture arrangement, shown in FIG. 5, ensures that the paraxial cone of light bounded by the projection system's marginal, i.e., outer-most rays 98 coincides with the paraxial cone of light bounded by the viewing system's marginal rays 100 near the object plane 92. The equal aperture condition can be achieved by setting two adjustable stops to the same size, or by including two fixed apertures of equal size, one aperture in the viewing system and one aperture in the projection system. Also, in depth-from-defocus optical systems wherein each of the viewing and projection system lenses are of the same size, the equal aperture condition can be achieved by not including aperture physical aperture stops, letting the diameters of the glass elements function as aperture stops.

Figure 6:
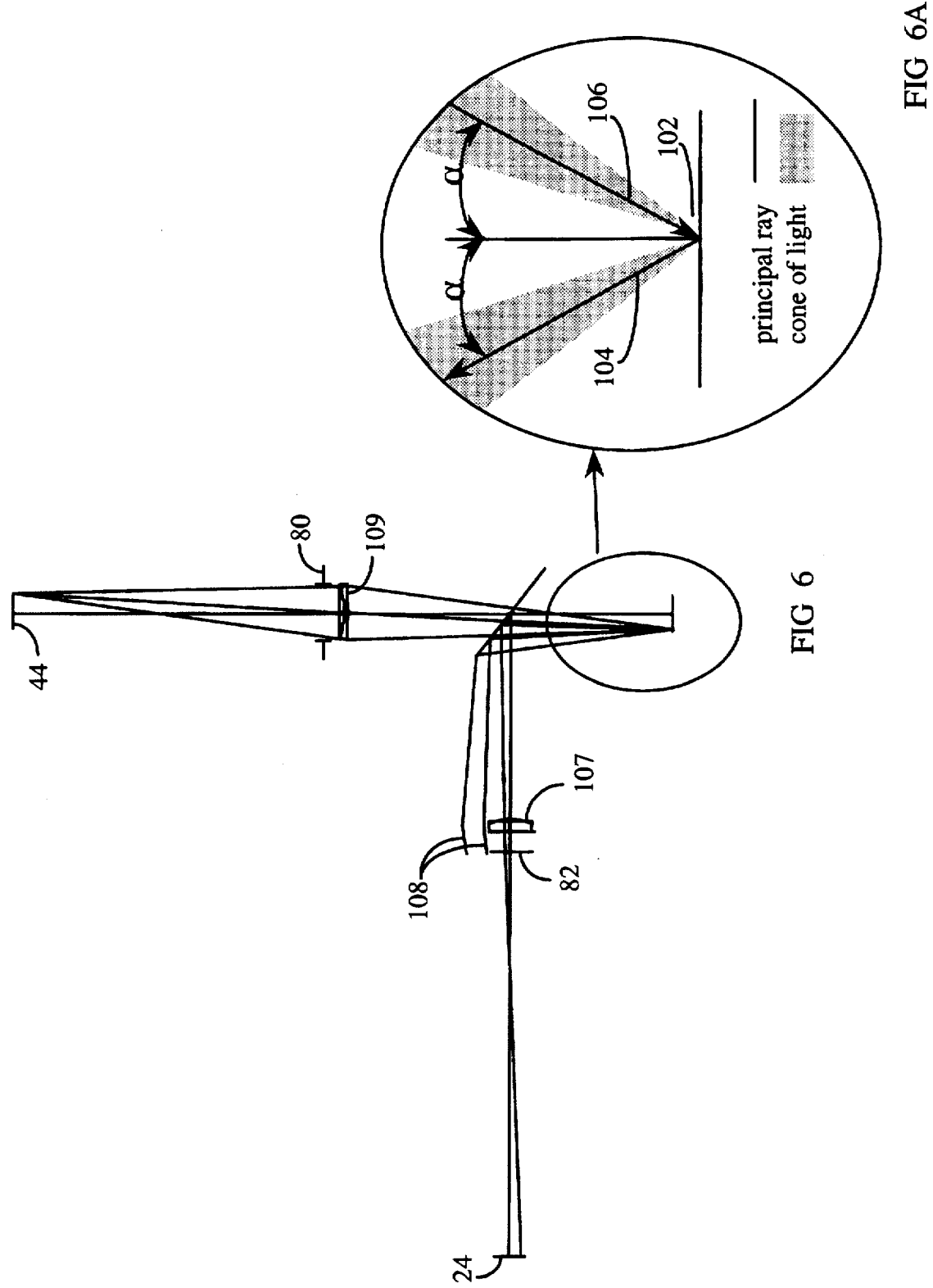
FIG. 6 is a schematic diagram of a depth-from-defocus optical apparatus of the invention having a projection system and a viewing system, each with the same working f-number. In this embodiment, non-telecentric optics, such as conventional camera objectives, are employed. The associated ray diagram illustrates a vignetting effect for off-axis specular object features.

Conventional photographic objectives, when included in a depth-from-defocus optical system according to the invention having equal working f-numbers, can vignette off-axis specular checks, as illustrated in FIGS. 6 and 6A. Here, the diameter of the projection lens aperture stop 80 is equal to the diameter of the imaging lens aperture stop 82. Although off-axis specular checks 102 continue to act as a mirrors to relay the mask image, the reflected cone of light 104 does not generally coincide, i.e., overlap, with the incident cone of light 106. An exaggerated depiction of the incident cone of light 106 following Snell's Law for Reflection is shown in enlarged detail in FIG. 6A. The divergence, 2α, of the cones of light 104, 106, causes reflected rays 108 of FIG. 6 to miss the imaging lens 107. Because these rays 108 never propagate through the lens 107 and onto the image sensor (CCD) 24, they are vignetted, i.e., they exit the optical system, thereby decoupling the projection and viewing systems, even given the mirror action of specular checks. As recognized by the invention, vignetting results in partially clipped or totally lost light reflected by off-axis specular checks. Thus, due to loss of light signal, vignetting is another source of specular false depth. For this reason, equating the working f-numbers of the projection system and the viewing system only eliminates false depth in the paraxial region of the field and cannot be considered a full-field solution to the problem of specular false depth over the entire field of view (FOV) of a depth-from-defocus optical system.

Figure 7:
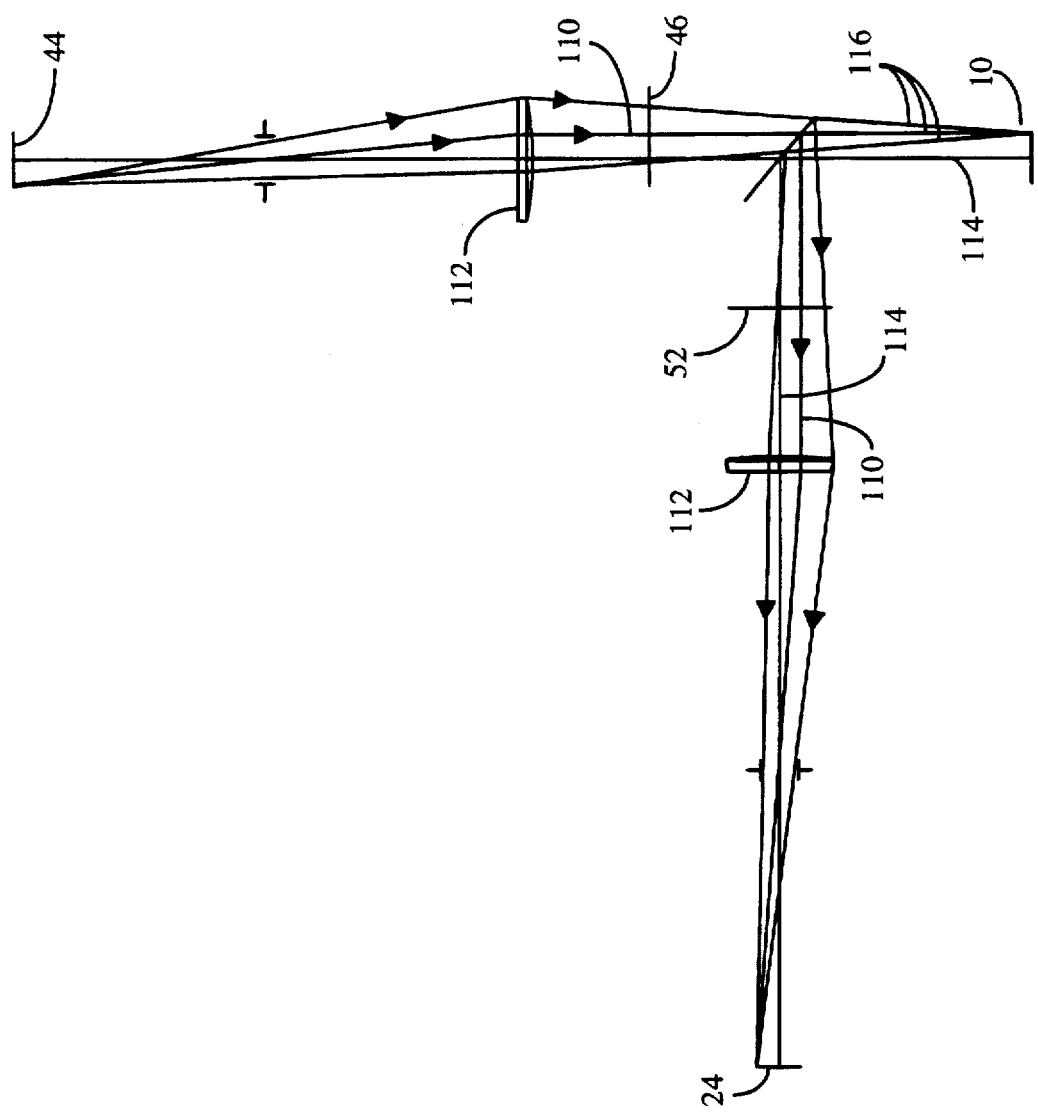
FIG. 7 is a schematic diagram of a depth-from-defocus optical apparatus of the invention having a projection system and a viewing system, each with the same working f-number. In this embodiment, object-side telecentric optics are employed. The associated ray diagram illustrates that off-axis specular object features will not be vignetted.

In a preferred embodiment of the invention, specular false depth may be eliminated across the entire FOV by using an "equal aperture" depth-from-defocus arrangement incorporating object-side telecentric projection and imaging lenses. Such an embodiment is shown in FIG. 7. Lenses exhibiting object-side telecentricity are commonly used in gauging applications to avoid gauging errors of defocused features. For this reason alone, many microscopes, optical comparators, and other optical metrology equipment, incorporate lenses exhibiting object-side telecentricity. The invention recognizes an additional desirable property of object-side telecentricity; lenses exhibiting object-side telecentricity, including doubly telecentric lenses, do not vignette off-axis optically coupled specular object features in depth-from-defocus optical systems.

Object-side telecentric lens assemblies have the special property that the principal rays on the object-side 110 of the telecentric lenses 112 are substantially parallel to the optical axes 114 of the telecentric lenses 112. (See, for example, Thomas, Woodlief, Jr.; *SPSE Handbook of Photographic Science and Engineering*; John Wiley and Sons 1973; herein incorporated by reference in its entirety, pg 253.) Thus, the reflectance angle α of FIG. 6A is always zero, and consequently the incident and reflected cones coincide, as illustrated by the rays 116. In this embodiment there is no vignetting because all checkered mask 44 image rays that reflect off specular checks on the object 10 are imaged on the CCD 24, i.e., no light is lost. Such an embodiment of the invention is invariant to surface reflectance properties across the full field of view of the depth-from-defocus optical system.

In contrast with the present invention, known depth-from-defocus systems, such as M. Watanabe, S. K. Nayar, and M. Noguchi, "Real-time Computation of depth from defocus". Proc. of the SPIE, vol 2599:A-03, p.14–25, November 1995, incorporate telecentric lens assemblies that exhibit only image-side telecentricity. Such image-side telecentric lens assemblies are similar to conventional camera objectives in that their angle of reflection a is always non-zero for off-axis specular object features. Consequently, full-field invariance to surface reflectance properties can only be achieved by using telecentric lens assemblies that exhibit object-side telecentricity.

Figure 8:
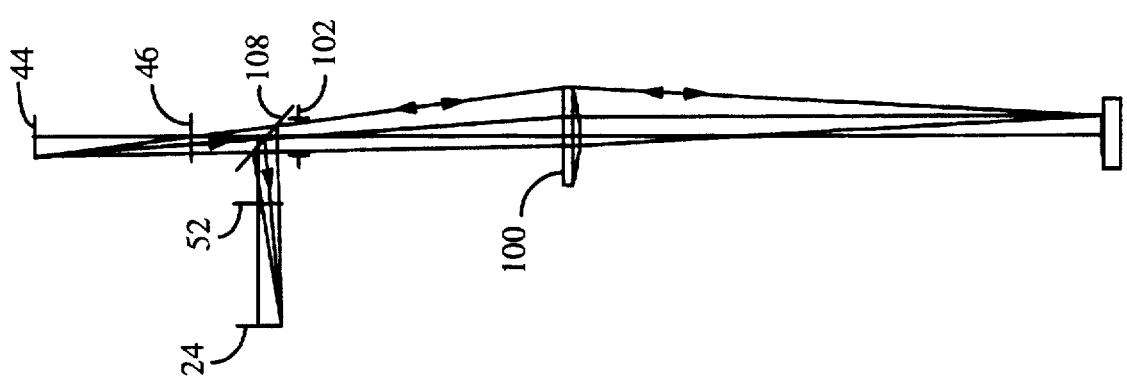
FIG. 8 a single lens embodiment of the invention employing object-side telecentric optics, and optional uncrossed polarizers. A beam-splitter allows the projection system and the viewing system to share a common lens and aperture stop. The associated ray diagram illustrates that off-axis specular object features will not be vignetted in this embodiment.

The projection and the imaging system can include one or more common elements, such as a common aperture stop, and/or a common lens assembly. For example, FIG. 8 shows a single lens, single stop embodiment of the invention wherein a lens 100 and an aperture stop 102 are employed for both projecting illumination onto the object 10, and viewing the light rays reflected from the object 10. The common lens assembly, consisting of the lens 100 and the aperture stop 102, exhibits object-side telecentricity. In this embodiment, the optional uncrossed polarizers 46, 52 are on the image side of the object-side telecentric lens assembly. A beam-splitter 108 allows the projection system and the viewing system to share the common lens 100 and common aperture stop 102. The associated ray diagram in FIG. 8 illustrates that off-axis specular object features will not be vignetted in this embodiment, due to the object-side telecentricity of this optical configuration.

Because the projection system shares the same lens as the viewing system in the embodiment of FIG. 8, backscatter and veiling glare inherently degrade the optical performance of this embodiment. Although the degradation of optical performance may be minimized by use of anti-reflective coating, light-baffles, and/or other conventional light control techniques, the two-lens embodiment of FIG. 7 has the potential to offer better optical performance than the single-lens embodiment of FIG. 8.

Thus, the invention embraces all two lens systems thereof, and all optically equivalent hybrids thereof, including systems with one or more common elements, such as a common aperture stop and/or lens assembly.

Other modifications and implementations will occur to those skilled in the art without departing from the spirit and the scope of the invention as claimed. Accordingly, the above description is not intended to limit the invention except as indicated in the following claims.

What is claimed is:

1. A depth-from-defocus optical apparatus for use with a depth-from-defocus three-dimensional imaging system for obtaining a depth image of an object, the optical apparatus comprising:

an illumination source for providing rays of incident light;

a projection lens assembly, characterized by a working f-number, for converging the rays of incident light towards an object plane;

a viewing lens assembly, also characterized by said working f-number, for converging rays of reflected light originating from a surface of the object towards an image plane, the object being disposed generally at said object plane; and a beam splitting device disposed so as to permit a portion of said rays of incident light to reach said object, and disposed so as to permit a portion of said rays of reflected light to enter said viewing lens assembly.

2. The apparatus of claim 1, wherein said projection lens assembly includes an adjustable aperture stop.

3. The apparatus of claim 1, wherein said viewing lens assembly includes an adjustable aperture stop.

4. The apparatus of claim 1, wherein said viewing lens assembly and said projection lens assembly share at least one common optical element.

5. The apparatus of claim 1, wherein said illumination source comprises:

a light source;

a condenser lens; and a periodic illumination mask.

6. The apparatus of claim 1, wherein said illumination source comprises:

a light source; and a condenser lens.

7. The apparatus of claim 1, wherein said projection lens assembly includes a first polarizer in a first angular orientation, and said viewing lens assembly includes a second polarizer in a second angular orientation, said first angular orientation differing from said second angular orientation by a difference angle magnitude substantially different from 90 degrees, and substantially different from 270 degrees.

8. The apparatus of claim 1, further including a pair of polarizers, the relative orientation of the pair of polarizers being adjustable.

9. The apparatus of claim 7, wherein said first polarizer and said second polarizer are angularly oriented relative to each other such that a range of intensities of specular object feature reflections is substantially close to a range of intensities of diffuse object feature reflections.

10. The apparatus of claim 1, wherein said projection lens assembly exhibits object-side telecentricity.

11. The apparatus of claim 1, wherein said viewing lens assembly exhibits object-side telecentricity.

12. The apparatus of claim 1, further comprising:

only one image sensor.

13. The apparatus of claim 1, wherein said beam splitting device is disposed so as to make a focal plane of the viewing lens assembly coincident with a focal plane of the projection lens assembly.

14. The apparatus of claim 1, wherein said beam splitting device is disposed so as to fold a portion of a central axis of the viewing lens assembly into coaxial relationship with a portion of a central axis of the projection lens assembly.

15. A depth-from-defocus optical apparatus for use with a depth-from-defocus three-dimensional imaging system for obtaining a depth image of an object, the optical apparatus comprising:

an illumination source for providing rays of incident light;

a projection lens assembly, characterized by a working f-number, for converging the rays of incident light towards an object plane;

a viewing lens assembly exhibiting object-side telecentricity, also characterized by said working f-number, for converging rays of reflected light originating from a surface of the object towards an image plane, the object being disposed generally at said object plane; and a beam splitting device disposed so as to permit a portion of said rays of incident light to reach said object, and disposed so as to permit a portion of said rays of reflected light to enter said viewing lens assembly.

16. The apparatus of claim 15, wherein said projection lens assembly includes an adjustable aperture stop.

17. The apparatus of claim 15, wherein said viewing lens assembly includes an adjustable aperture stop.

18. The apparatus of claim 15, wherein said viewing lens assembly and said projection lens assembly share at least one common optical element.

19. The apparatus of claim 15, wherein said illumination source comprises:

a light source;

a condenser lens; and a periodic illumination mask.

20. The apparatus of claim 15, wherein said illumination source comprises:

a light source; and a condenser lens.

21. The apparatus of claim 15, wherein said projection lens assembly includes a first polarizer in a first angular orientation, and said viewing lens assembly includes a second polarizer in a second angular orientation, said first angular orientation differing from said second angular orientation by a difference angle magnitude substantially different from 90 degrees, and substantially different from 270 degrees.

22. The apparatus of claim 15, further including a pair of polarizers, the relative orientation of the pair of polarizers being adjustable.

23. The apparatus of claim 21, wherein said first polarizer and said second polarizer are angularly oriented relative to each other such that a range of intensities of specular object feature reflections is substantially close to a range of intensities of diffuse object feature reflections.

24. The apparatus of claim 15, wherein said projection lens assembly exhibits object-side telecentricity.

25. The apparatus of claim 15, further comprising:
only one image sensor.

26. The apparatus of claim 15, wherein said beam splitting device is disposed so as to make a focal plane of the viewing lens assembly coincident with a focal plane of the projection lens assembly.

27. The apparatus of claim 15, wherein said beam splitting device is disposed so as to fold a portion of a central axis of the viewing lens assembly into coaxial relationship with a portion of a central axis of the projection lens assembly.

28. A depth-from-defocus optical apparatus for use with a depth-from-defocus three-dimensional imaging system for obtaining a depth image of an object, the optical apparatus comprising:
an illumination source for providing rays of incident light;
a projection lens assembly, characterized by a working f-number, for converging the rays of incident light towards an object plane, said projection lens assembly including a first polarizer in a first angular orientation;
a viewing lens assembly, also characterized by said working f-number, for converging rays of reflected light originating from the surface of the object towards an image plane, the object being disposed generally at said object plane, said viewing lens assembly including a second polarizer in a second angular orientation, said second angular orientation differing from said first angular orientation by a difference angle magnitude substantially different from 90 degrees and substantially different from 270 degrees; and
a beam splitting device disposed so as to permit a portion of said rays of incident light to reach said object, and disposed so as to permit a portion of said rays of reflected light to enter said viewing lens assembly.

29. The apparatus of claim 28, wherein said projection lens assembly includes an adjustable aperture stop.

30. The apparatus of claim 28, wherein said viewing lens assembly includes an adjustable aperture stop.

31. The apparatus of claim 28, wherein said viewing lens assembly and said projection lens assembly share at least one common optical element.

32. The apparatus of claim 28, wherein said illumination source comprises:
a light source;
a condenser lens; and
a periodic illumination mask.

33. The apparatus of claim 28, wherein said illumination source comprises:
a light source; and
a condenser lens.

34. The apparatus of claim 28, the orientation of the polarizer of the viewing assembly being adjustable with respect to the orientation of the polarizer of the projection assembly.

35. The apparatus of claim 28, wherein said first polarizer and said second polarizer are angularly oriented relative to each other such that a range of intensities of specular object feature reflections is substantially close to a range of intensities of diffuse object feature reflections.

36. The apparatus of claim 28, wherein said projection lens assembly exhibits object-side telecentricity.

37. The apparatus of claim 28, wherein said viewing lens assembly exhibits object-side telecentricity.

38. The apparatus of claim 28, further comprising:
only one image sensor.

39. The apparatus of claim 28, wherein said beam splitting device is disposed so as to make a focal plane of the viewing lens assembly coincident with a focal plane of the projection lens assembly.

40. The apparatus of claim 28, wherein said beam splitting device is disposed so as to fold a portion of a central axis of the viewing lens assembly into coaxial relationship with a portion of a central axis of the projection lens assembly.

41. A depth-from-defocus optical apparatus for use with a depth-from-defocus three-dimensional imaging system for obtaining a depth image of an object, the optical apparatus comprising:
an illumination source for providing rays of incident light;
a projection lens assembly, characterized by a working f-number, for converging the rays of incident light towards an object plane, said projection lens assembly including a first polarizer in a first angular orientation, said projection lens assembly being structured so as to exhibit object-side telecentricity;
a viewing lens assembly, also characterized by said working f-number, for converging rays of reflected light originating from the surface of the object towards an image plane, the object being disposed generally at said object plane, said viewing lens assembly being structured so as to exhibit object-side telecentricity, said viewing lens assembly including a second polarizer in a second angular orientation, said second angular orientation differing from said first angular orientation by a difference angle magnitude substantially different from 90 degrees and substantially different from 270 degrees; and
a beam splitting device disposed so as to permit a portion of said rays of incident light to reach said object, and disposed so as to permit a portion of said rays of reflected light to enter said viewing lens assembly.

42. The apparatus of claim 41, wherein said projection lens assembly includes an adjustable aperture stop.

43. The apparatus of claim 41, wherein said viewing lens assembly includes an adjustable aperture stop.

44. The apparatus of claim 41, wherein said viewing lens assembly and said projection lens assembly share at least one common optical element.

45. The apparatus of claim 41, wherein said illumination source comprises:
a light source;
a condenser lens; and
a periodic illumination mask.

46. The apparatus of claim 41, wherein said illumination source comprises:
a light source; and
a condenser lens.

47. The apparatus of claim 41, wherein said first polarizer and said second polarizer are angularly oriented relative to each other such that a range of intensities of specular object feature reflections is substantially close to a range of intensities of diffuse object feature reflections.

48. The apparatus of claim 41, further comprising:
only one image sensor.

49. The apparatus of claim 41, wherein said beam splitting device is disposed so as to make a focal plane of the viewing lens assembly coincident with a focal plane of the projection lens assembly.

50. The apparatus of claim 41, wherein said beam splitting device is disposed so as to fold a portion of a central axis of the viewing lens assembly into coaxial relationship with a portion of a central axis of the projection lens assembly.

* * * * *